UNITED STATES PATENT OFFICE.

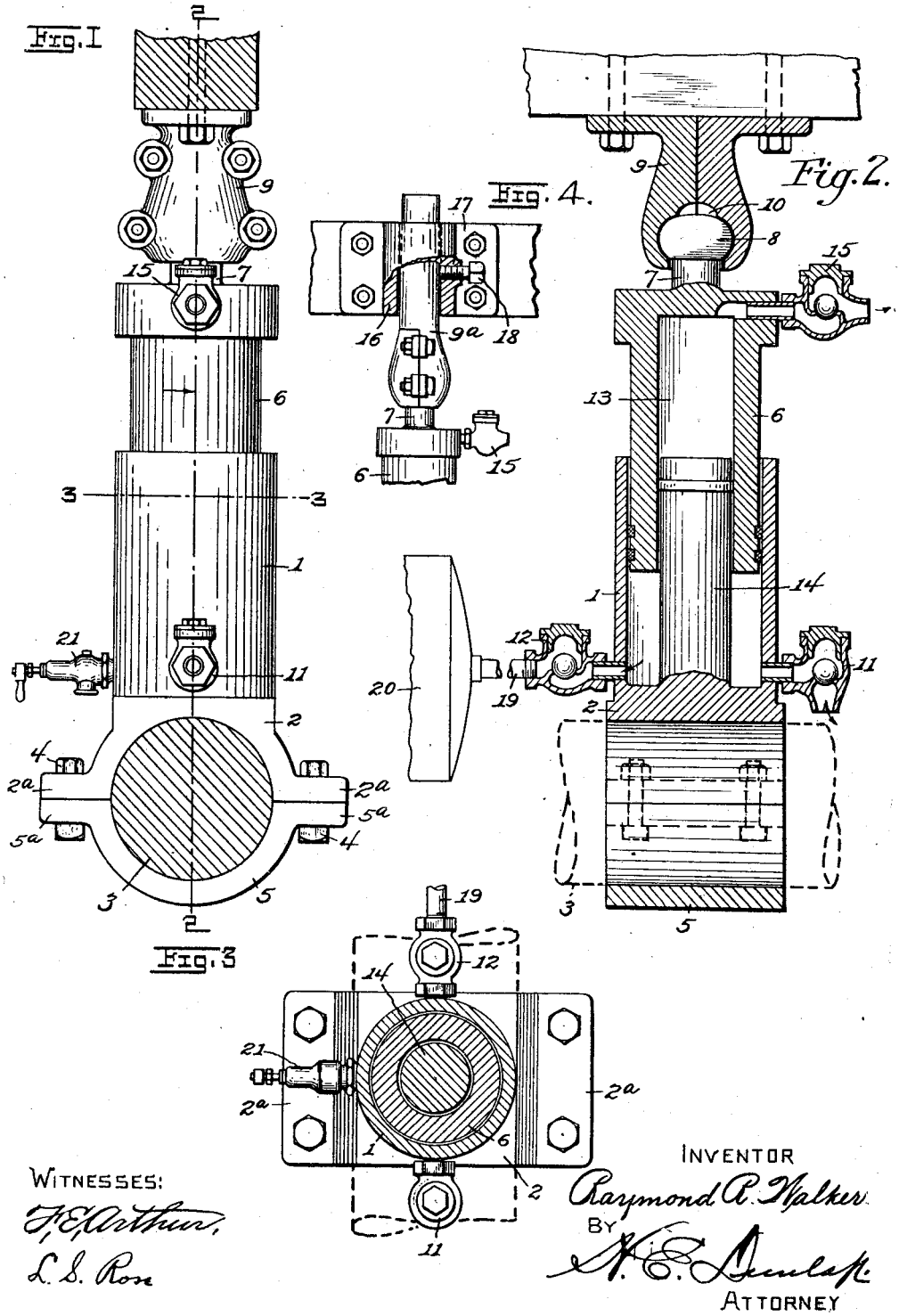

RAYMOND R. WALKER, OF FOLLANSBEE, WEST VIRGINIA, ASSIGNOR OF ONE-HALF TO DAVID WALKER, OF FOLLANSBEE, WEST VIRGINIA.

SHOCK-ABSORBER.

1,106,014. Specification of Letters Patent. Patented Aug. 4, 1914.

Application filed November 24, 1913. Serial No. 802,654.

*To all whom it may concern:*

Be it known that I, RAYMOND R. WALKER, a citizen of the United States of America, and resident of Follansbee, county of Brooke, and State of West Virginia, have invented certain new and useful Improvements in Shock-Absorbers, of which the following is a specification.

This invention relates to improvements in shock absorbers, and more particularly to a shock absorber for automobiles and similar vehicles.

The primary object of the invention is to provide a simple, durable and and comparatively inexpensive device, occupying but small space, which is adapted to effectually dissipate or minimize the shocks and jars incident to road travel, and thus prevent such shocks from being communicated to the body of the vehicle.

A further object of the invention is to provide a device of the character mentioned wherein is involved both the principle of a pneumatic cushion and that of a vacuum dashpot.

With these and other objects in view, the invention resides in the features of construction, arrangement of parts and combination of elements which will hereinafter be fully described, reference being had to the accompanying drawings, forming a part of this specification, in which—

Figure 1 is a side elevation of the invention; Fig. 2 is a vertical section on the line 2—2, Fig. 1; Fig. 3 is a horizontal section on line 3—3, Fig. 1; and Fig. 4 illustrates a modified form of frame connection.

Referring to said drawings, in which like designating characters distinguish like parts throughout the several views 1 indicates a hollow cylinder, open at its upper end, which preferably has formed thereon an integral base, as 2, adapted for seating upon a vehicle axle 3, being rigidly connected to the latter by means of bolts 4 directed through oppositely disposed lugs 2ª and the lugs 5ª of a clamping member 5. Vertically movable within said cylinder 1 and operating through the open end of the latter is a plunger 6 to the upper end of which is rigidly attached, or which has formed integral therewith, an upright stem 7 which is terminated by a knob or ball 8, said ball constituting one member of a ball-and-socket joint, the other member of which is constituted by a stem 9 adapted for attachment to the vehicle body, or to the vehicle frame, and having a socket 10 in its lower end. An inlet valve 11, preferably of the ball-check type is provided in the lower end of the cylinder 1 through which air is admitted to constitute a cushion which receives the impact of the plunger produced by violent shocks due to contact of the vehicle wheels with uneven road surfaces. Also provided in the lower end of said cylinder is an air-outlet, or exhaust, valve 12, also of a ball-check type, as shown.

The plunger 6 is made hollow and has its lower end open, while its upper end is closed against the admission of air, as is clearly shown in Fig. 2. Received within the hollow chamber 13 of said plunger is a stem or plunger 14 which rises vertically from the base of the cylinder, said stem having a concentric disposition within said cylinder. As is apparent, when the plunger 6 moves downward within the cylinder 1, the stem 14 displaces the air in the chamber 13, said air exhausting through an exhaust valve 15 of ball-check type provided in the upper end of the plunger 6. When said plunger 6 moves upward, a partial vacuum is produced in the chamber 13. Thus, rapid rebounds which would otherwise subject the vehicle body to violent shocks are effectually prevented.

In the modification illustrated in Fig. 4, the stem 9ª is received within the sleeve-portion 16 of a member 17 which is adapted for attachment to the vehicle body or to the vehicle frame, and a set-screw 18 is directed through said sleeve-portion into impinging engagement with said stem for holding the latter in fixed position. With such construction, the device may be fitted to vehicles of different sizes and types, wherein the distance from the axle to the body or to a suitable portion of the frame varies to a considerable extent. The exhaust check-valve 12, when used, is connected by a line of tubing 19 to a suitable cylinder or container, as 20, for containing air under pressure to be utilized for operating motor-starting mechanism, for inflating tires, etc. As is obvious, the more or less continual movement of the plunger 6 within the cylinder 1 will suffice to maintain a considerable pressure of air within the container 20. When the container is not used and it is desired to discharge the air displaced by the plunger 6 in cylinder 1 directly to the atmosphere, a pop-valve 21 of a common type may be employed instead of the check-valve 12.

From the foregoing it will be manifest that, when irregularities in the roadway are encountered, the axle and body of the vehicle will be prevented from approaching each other violently, the plunger 6 acting against a yielding cushion of air within the cylinder 1, said air being permitted to exhaust from said cylinder either through check-valve 12, or a pop-valve 21, according as it is desired to direct air to a container or discharge the same to the atmosphere. It will also be apparent that violent rebounds of the axle and body with respect to each other is prevented by the provision of the chamber 13 in the plunger 6 and the stem or plunger 14 whereby a vacuum, or partial vacuum is formed which resists rapid movement of said parts in opposite directions, said plunger 6 and plunger 14 constituting in effect the parts of a vacuum dashpot. The ball-and-socket joint permits of a universal lateral movement, within a limited range, of the vehicle body with respect to the plunger 6.

Having thus described my invention, what I claim as new, and desire to secure by Letters Patent, is—

1. A shock absorber comprising a cylinder having its lower end adapted for mounting upon a vehicle axle and having an open upper end, means admitting air to and exhausting air from said cylinder, a plunger operating within said cylinder, said plunger being hollow and having its lower end open, an exhaust check-valve in the upper end of said plunger, a stem concentrically disposed within and in fixed relation to said cylinder and operating within the hollow of said plunger whereby a partial vacuum is formed upon withdrawal movement of said stem, and means for connecting said plunger to a vehicle body.

2. A shock absorber comprising a cylinder having its lower end adapted for mounting upon a vehicle axle and having an open upper end, means admitting air to and exhausting air from said cylinder, a plunger operating within said cylinder, said plunger being hollow and having its lower end open, an exhaust check-valve in the upper end of said plunger, a stem concentrically disposed within and having fixed relation to said cylinder and operating within the hollow of said plunger whereby a partial vacuum is formed upon withdrawal movement of said stem, and means for connecting said plunger to a vehicle body, said means permitting lateral movement of the body with respect to said plunger.

3. A shock absorber comprising a cylinder having its lower end adapted for mounting upon a vehicle axle and having an open upper end, means admitting air to and exhausting air from said cylinder, a plunger operating within said cylinder, said plunger being hollow and having its lower end open, an exhaust check-valve in the upper end of said plunger, a stem concentrically disposed within and having fixed relation to said cylinder and operating within the hollow of said plunger whereby a partial vacuum is formed upon withdrawal movement of said stem, and means for connecting said plunger to a vehicle body, a member adapted for mounting on a vehicle body, and a ball-and-socket connection between said plunger and said member.

4. A shock absorber comprising a cylinder having its lower end adapted for mounting upon a vehicle axle and having an open upper end, means admitting air to and exhausting air from said cylinder, a plunger operating within said cylinder, said plunger being hollow and having its lower end open, an exhaust check valve in the upper end of said plunger, a stem formed integral with and extending vertically from the base of said cylinder, said stem being concentrically disposed within said cylinder and operating within the hollow of said plunger whereby a partial vacuum is formed upon withdrawal movement of said stem, and means for connecting said plunger to a vehicle body.

5. A shock absorber comprising a cylinder having its lower end adapted for mounting upon a vehicle axle and having an open upper end, air inlet and exhaust check-valves in the lower end of said cylinder, an upright stationary stem disposed concentrically within said cylinder, a hollow cylindrical plunger adapted for having its upper end flexibly connected to a vehicle body, and an exhaust check-valve in the upper end of said plunger, said plunger operating snugly between said stem and the cylinder wall and coöperating with said stem for producing a partial vacuum within said plunger upon withdrawal movement of the latter.

In testimony whereof, I affix my signature in presence of two subscribing witnesses.

RAYMOND R. WALKER.

Witnesses:
 H. E. Dunlap,
 W. F. Keefer.